United States Patent
Scherr et al.

(10) Patent No.: US 9,835,472 B2
(45) Date of Patent: Dec. 5, 2017

(54) USING CARTESIAN COORDINATES FOR POSITION DETECTION WITH A MAGNETIC SENSOR

(71) Applicant: Infineon Technologies AG, Neubiberg (DE)

(72) Inventors: Wolfgang Scherr, Villach/Neulandskron (AT); Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 257 days.

(21) Appl. No.: 14/865,691

(22) Filed: Sep. 25, 2015

(65) Prior Publication Data

US 2017/0089726 A1 Mar. 30, 2017

(51) Int. Cl.
*G01D 5/16* (2006.01)
*G01D 5/14* (2006.01)
*G01D 5/20* (2006.01)

(52) U.S. Cl.
CPC .............. *G01D 5/145* (2013.01); *G01D 5/16* (2013.01); *G01D 5/2006* (2013.01)

(58) Field of Classification Search
CPC ...... G01V 3/08; G06F 3/0354; G01R 33/1269
See application file for complete search history.

(56) References Cited

U.S. PATENT DOCUMENTS

| | | | |
|---|---|---|---|
| 7,203,618 B2* | 4/2007 | Hammerschmidt ... | G01B 21/22 702/150 |
| 7,288,931 B2* | 10/2007 | Granig ................... | H03M 1/06 324/202 |
| 2013/0241537 A1* | 9/2013 | Hammerschmidt ... | B82Y 25/00 324/207.21 |

\* cited by examiner

*Primary Examiner* — Giovanni Astacio-Oquendo
*Assistant Examiner* — Alvaro Fortich
(74) *Attorney, Agent, or Firm* — Harrity & Harrity, LLP

(57) ABSTRACT

A magnetic sensor, may sense a first magnetic field component corresponding to a first axis of a magnetic field produced by a magnet. The magnetic sensor may sense a second magnetic field component corresponding to a second axis of the magnetic field. The magnetic sensor may determine information that defines potential positions of a movable object associated with the magnet. Each potential position, of the potential positions, may be defined by a first magnetic field range for the first magnetic field component and a second magnetic field range for the second magnetic field component. The magnetic sensor may identify a position of the movable object based on the first magnetic field component, the second magnetic field component, and the information that defines the potential positions. The magnetic sensor may provide an output based on identifying the position of the movable object.

20 Claims, 11 Drawing Sheets

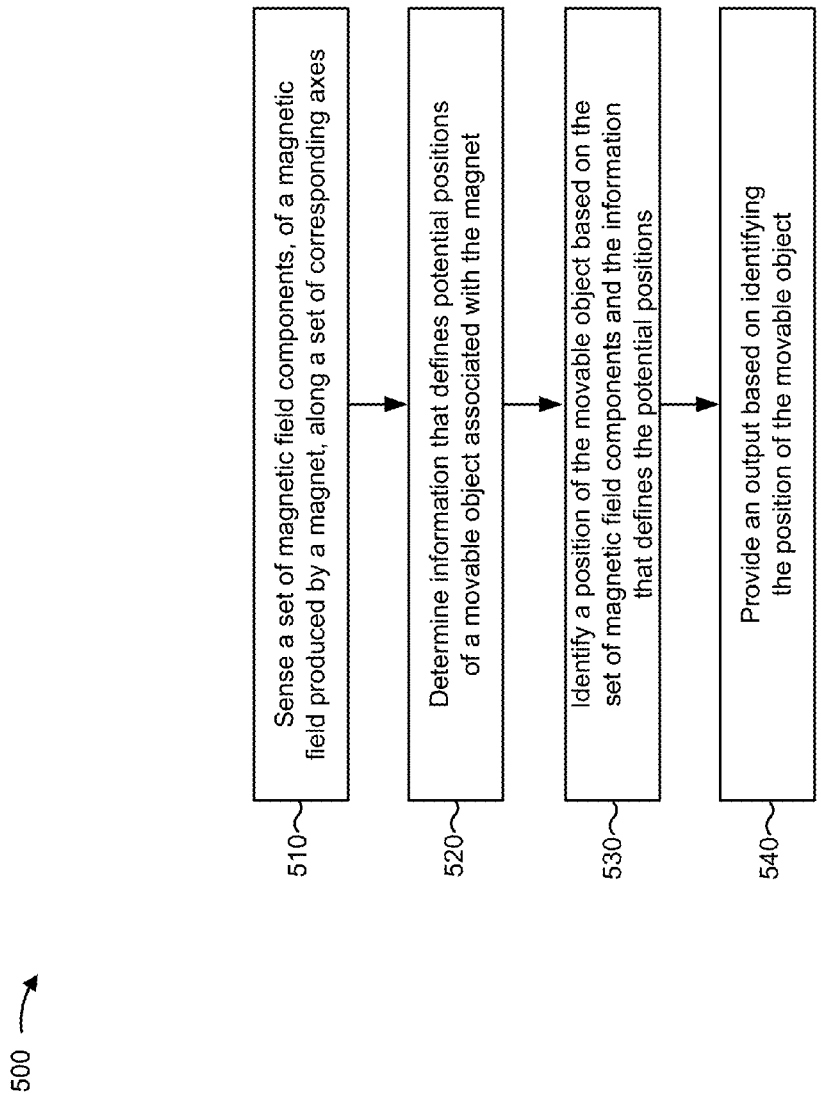

USING CARTESIAN COORDINATES FOR POSITION DETECTION WITH A MAGNETIC SENSOR

BACKGROUND

A magnetic sensor may be used to determine a position of a movable object, connected to a magnet, based on a magnetic field produced by the magnet. For example, the magnetic sensor may be used to determine a linear position of the movable object, an angular position of the movable object, a position of the movable object on a two-dimensional plane, a position of the movable object in a three-dimensional space, or the like.

SUMMARY

According to some possible implementations, a magnetic sensor may include one or more sensing elements configured to: sense a first magnetic field component corresponding to a first axis of a magnetic field produced by a magnet; sense a second magnetic field component corresponding to a second axis of the magnetic field; determine information that defines potential positions of a movable object associated with the magnet, where each potential position, of the potential positions, may be defined by a first magnetic field range for the first magnetic field component and a second magnetic field range for the second magnetic field component; identify a position of the movable object based on the first magnetic field component, the second magnetic field component, and the information that defines the potential positions; and provide an output based on identifying the position of the movable object.

According to some possible implementations, a system may include a magnetic sensor configured to: sense a first magnetic field component corresponding to a first axis of a magnetic field produced by a magnet; sense a second magnetic field component corresponding to a second axis of the magnetic field; determine information that defines potential positions of a movable object to which the magnet is connected, where each potential position, of the potential positions, may be defined by a first magnetic field range for the first magnetic field component and a second magnetic field range for the second magnetic field component; identify a position of the movable object based on the first magnetic field component or the second magnetic field component, and the information that defines the potential positions; and provide an output that includes information that identifies the position of the movable object.

According to some possible implementations, a magnetic sensor may include one or more sensing elements configured to: sense a first magnetic field component corresponding to a first axis of a magnetic field produced by a magnet; sense a second magnetic field component corresponding to a second axis of the magnetic field; sense a third magnetic field component corresponding to a third axis of the magnetic field; determine information that defines potential positions of a movable object associated with the magnet, where each potential position, of the potential positions, may be defined by a first magnetic field range for the first magnetic field component, a second magnetic field range for the second magnetic field component, and a third magnetic field range for the third magnetic field component; identify a position of the movable object based on the first magnetic field component, the second magnetic field component, or the third magnetic field component, and the information that defines the potential positions; and provide an output based on identifying the position of the movable object.

BRIEF DESCRIPTION OF THE DRAWINGS

FIG. 5 is a flow chart of an example process for identifying a position of a movable object based on a set of magnetic field components and information that defines potential positions of the movable object;

DETAILED DESCRIPTION

Figure 1:
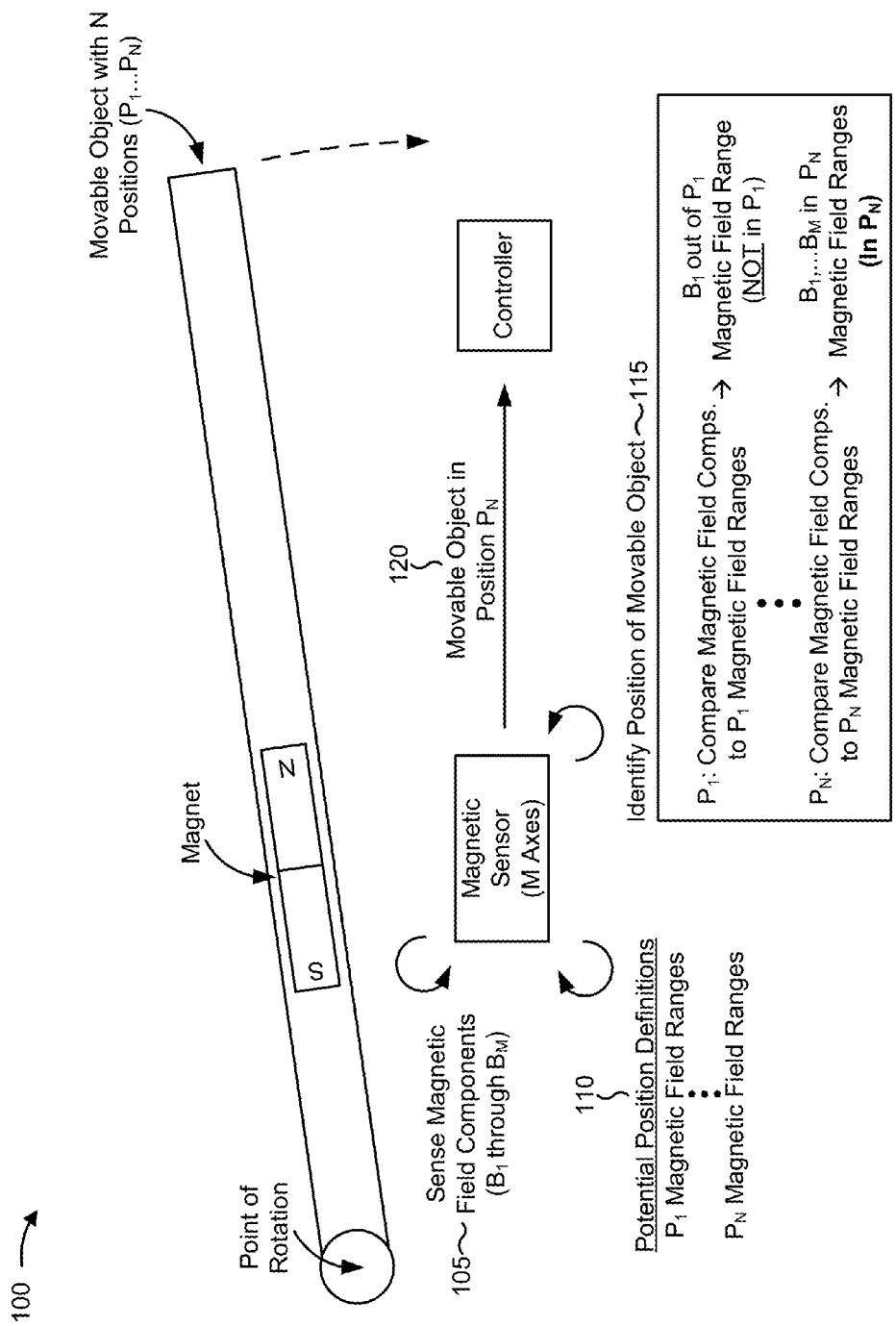
FIG. 1 is a diagram of an overview of an example implementation described herein.

The following detailed description of example implementations refers to the accompanying drawings. The same reference numbers in different drawings may identify the same or similar elements.

A magnetic sensor may be configured to sense components of a magnetic field being generated by a magnet connected to a movable object. The movable object may move linearly, about an axis, within a two-dimensional plane, within a three-dimensional space, or the like. Conveniently, the magnet (and the magnetic field) may be moving with the movable object. It is assumed for the remainder of this disclosure that the magnet follows the motion of the movable object (i.e., that the magnet moves in correspondence to the movable object). This may be achieved by providing a connection (e.g., a mechanical connection) between the magnet and the movable object. Assuming a non-slip condition between the magnet and the movable object, the position of the magnet corresponds to the position of the movable object.

In some cases, the components of the magnetic field, as sensed by the magnetic sensor, may be related to a Cartesian coordinate system. For example, the sensed components may include an x-component corresponding to an x-axis, a y-component corresponding to a y-axis, and/or a z-component corresponding to a z-axis. A position of the movable object may be determined based on the sensed components of the moving magnetic field. However, determining the position may be based on a polar coordinate system, meaning that a set of angles, associated with the magnetic field, needs to be calculated from the sensed (Cartesian) components of the magnetic field. For example, an angle associated with an x-y plane, an angle associated with an x-z plane, and/or an angle associated with a y-z plane may be used to determine the position based on the polar coordinate system. In some implementations, the set of angles may be calculated based on the sensed (Cartesian) components of the magnetic field based on evaluating a group of trigonometric functions.

However, calculating the set of angles, associated with the polar coordinate system, from the sensed components, associated with the Cartesian coordinate system, introduces a number of problems. One such problem is that an error in a position determined based on the set of calculated angles may be difficult to determine due to errors present in the individual sensed components of the magnetic field. In other words, since the set of angles is calculated based on the sensed components of the magnetic field, errors present in the individual sensed components may be compounded and/or obfuscated such that an error in the determined position is difficult to ascertain.

Moreover, using an angle calculation that is based on the sensed components, associated with a Cartesian coordinate system, leads to a common-cause error. Similarly, since the determination of the position is based on the set of angles, associated with the polar coordinate system, that are determined using the sensed components, there is no opportunity to perform a plausibility check associated with the determined position.

Another problem is that, in order to calculate the set of angles, the sensed components of the magnetic field should be precisely orthogonal to one another in order to accurately derive the set of angles. Thus, sensing elements of the magnetic sensor configured to sense each component of the magnetic field need to be precisely positioned during assembly and operation of the magnetic sensor, which may be difficult to ensure. An additional problem is that calculating the set of angles may require evaluation of the group of trigonometric functions, which may necessitate inclusion of additional components in the magnetic sensor and/or a microcontroller with such capabilities.

Implementations described herein may relate to a magnetic sensor configured to determine a position of a movable object, to which a magnet is connected, based on a set of sensed components of a magnetic field (produced by the magnet) corresponding to a set of axes (i.e., without converting the set of sensed components to polar coordinates). In some implementations, the sensed components of the magnetic field may correspond to axes of a Cartesian coordinate system (e.g., an x-axis, a y-axis, a z-axis, etc.) and/or one or more other axes (e.g., an axis that is not orthogonal to the x-axis, the y-axis, and/or the z-axis). Determining the position of the movable object in this manner improves coverage of the magnetic sensor, error detection of the magnetic sensor, and/or plausibility checking capability of the magnetic sensor.

FIG. 1 is a diagram of an overview of an example implementation 100 described herein. For the purposes of example implementation 100, assume that a movable object is positioned to rotate about a point of rotation in a two-dimensional plane such that the movable object is one of N potential positions (e.g., $P_1$ through $P_N$) on the two-dimensional plane. Further, assume that a magnet is attached to the movable object such that a magnetic field, generated by the magnet, moves in correspondence with the movable object. Finally, assume that a magnetic sensor is configured to identify a position of the movable object, and that the magnetic sensor includes a set of sensing elements, where each sensing element is configured to sense a component of the magnetic field corresponding to one of M axes (e.g., an x-axis, a y-axis, a z-axis, an axis that is not orthogonal to the x-axis, the y-axis, and/or the z-axis, etc.).

As shown in FIG. 1, and by reference number 105, each sensing element of the magnetic sensor may sense a corresponding magnetic field component of the magnetic field. For example, a first sensing element may sense a component of the magnetic field (e.g., $B_1$) corresponding to a first axis, a second sensing element may sense a component of the magnetic field (e.g., $B_2$) corresponding to a second axis, an M-th sensing element may sense a component of the magnetic field (e.g., $B_M$) corresponding to an M-th axis, and so on.

As shown by reference number 110, after sensing the components of the magnetic field, the magnetic sensor may determine (e.g., based on information stored by the magnetic sensor) information that defines potential positions of the movable object. In some implementations, information that defines a potential position may include information that identifies a set of magnetic field ranges corresponding to each axis of the set of M axes, where the set of magnetic field ranges may uniquely correspond to the potential position. As such, the magnetic sensor may determine whether the movable object is in the potential position by comparing the sensed components of the magnetic field to the set of magnetic field ranges that define the potential position, an example of which is described below.

As shown by reference number 115, the magnetic sensor may identify the position of the movable object based on the information that defines the potential positions and the sensed magnetic field components. For example, as shown, the magnetic sensor may compare sensed magnetic field component $B_1$ to a magnetic field range, associated with position $P_1$, that corresponds to the first axis. As shown, based on the comparison, the magnetic sensor may determine that sensed magnetic field component $B_1$ is not within the magnetic field range, associated with position $P_1$, that corresponds to the first axis. As such, the magnetic sensor may determine that the movable object is not in position $P_1$.

As further shown, the magnetic sensor may compare sensed magnetic field component $B_1$ to a magnetic field range, associated with position $P_N$, that corresponds to the first axis. As shown, based on the comparison, the magnetic sensor may determine that sensed magnetic field component $B_1$ is within the magnetic field range, associated with position $P_N$, that corresponds to the first axis. For the purposes of example implementation 100, assume that the magnetic sensor similarly determines that sensed magnetic field components $B_2$ through $B_M$ lie within magnetic field ranges, associated with position $P_N$, corresponding to the second axis through the M-th axis. As such, the magnetic sensor may determine that the movable object is in position $P_N$. As shown by reference number 120, based on identifying the position of the movable object, the magnetic sensor may output (e.g., to a controller) information indicating that the movable object is in position $P_N$.

In some implementations, one or more of the M axes may be associated with a Cartesian coordinate system. For example, the M axes may include an x-axis, a y-axis, and/or a z-axis. Additionally, or alternatively, the one or more axes may include one or more axes that are not based on the Cartesian coordinate system, such as an axis that is not orthogonal to and/or that lies between two axes of the Cartesian coordinate system (e.g., an xy-axis, a yz-axis, an xz-axis, etc.). In this way, a magnetic sensor may determine a position of a movable object, connected to a magnet, based on a set of sensed components of a magnetic field corresponding to a set of axes without converting the set of sensed components to polar coordinates.

Notably, while some implementations described herein are described in the context of determining a position of a movable object rotating about a point of rotation, in some implementations, the determination of the position may apply to a movable object moving in another manner, such as linearly, within a two-dimensional plane, within a three-dimensional space, or the like.

Figure 2:
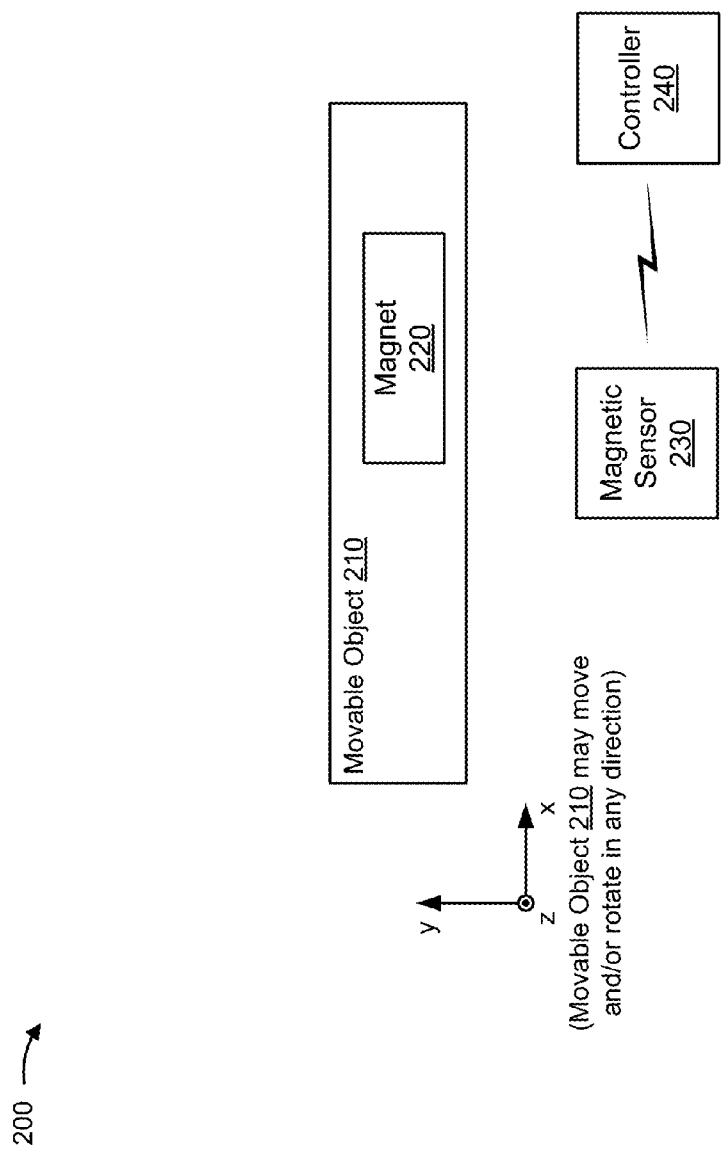
FIG. 2 is a diagram of an example environment in which apparatuses described herein may be implemented.

FIG. 2 is a diagram of example environments 200 in which apparatuses described herein may be implemented. As shown in FIG. 2, environment 200 may include a movable object 210, a magnet 220, a magnetic sensor 230, and a controller 240.

Movable object 210 may include an object capable of moving in relation to magnetic sensor 230. For example, movable object 210 may include an object capable of moving linearly, moving within a two-dimensional plane, moving within a three-dimensional space, rotating about a point of rotation, or the like. As examples, movable object may include, but is not limited to, a joystick, a lever (e.g., a gear shift lever, a turn signal lever, etc.), a movable and/or rotatable knob, or the like. In some implementations, movable object 210 may be connected (e.g., mechanically) to magnet 220 such that a movement of magnet 220 corresponds to a movement of movable object 210.

In some implementations, movable object 210 may be connected (e.g. mechanically) to magnetic sensor 230 instead and magnet 220 is not moving. Furthermore, an implementation may comprise two movable objects 210, where a first movable object 210 is connected to magnetic sensor 230 and a second movable object 210 is connected to magnet 220. Such a setup may be used to enhance or reduce a change of distance between magnet 220 and magnetic sensor 230 by the means of, for example, an interconnected mechanical system controlling the movement of the two movable objects 210.

Magnet 220 may include one or more magnets positioned to move with movable object 210. In the example environment 200 shown in FIG. 2, magnet 220 comprises a first half forming a north pole (N) and a second half forming a south pole (S), so that magnet 220 comprises one pole pair. In some implementations, magnet 220 may comprise more than one pole pair. While magnet 220 is shown as rectangular in FIG. 2, in some implementations, magnet 220 may be of another shape, such as a square shape, a circular shape, an elliptical shape, or the like. Movement of movable object 210 will correspond to movement of magnet 220 provided there is a non-slip relation between movable object 210 and magnet 220.

Additionally, or alternatively, magnet 220 may include a dipole magnet (e.g., a dipole bar magnet, a circular dipole magnet, an elliptical dipole magnet, etc.), a permanent magnet, an electromagnet, a combination of two or more types of magnets (e.g., a combination of a permanent magnet and an electromagnet, etc.) a magnetic tape, or the like. Magnet 220 may be comprised of a ferromagnetic material (e.g., Hard Ferrite), and may produce a magnetic field. Magnet 220 may further comprise a rare earth magnet which may be of advantage due to an intrinsically high magnetic field strength of rare earth magnets. As described above, in some implementations, magnet 220 may be attached to or coupled with movable object 210 for which a position is to be determined by magnetic sensor 230.

Magnetic sensor 230 may include one or more apparatuses for detecting components of a magnetic field for use in determining a position of magnet 220. For example, magnetic sensor 230 may include one or more circuits (e.g., one or more integrated circuits). In some implementations, magnetic sensor 230 may be placed at a position relative to magnet 220 such that magnetic sensor 230 may detect components of a magnetic field generated by magnet 220. Generally, a static magnetic field generated by the magnet 220 is sufficient. However, in some implementations, it may be advantageous to deploy a dynamic magnetic field or a combination of a static magnetic field and a dynamic generated magnetic field. Magnetic sensor 230 may then determine whether a sensed magnetic field is generated by magnet 220 or is an external magnetic field.

In some implementations, magnetic sensor 230 may include sensing elements configured to sense amplitudes of components of a magnetic field present at magnetic sensor 230, such as an x-component of the moving magnetic field, a y-component of the moving magnetic field, a z-component of the moving magnetic field, an xy-component of the moving magnetic field, a yz-component of the moving magnetic field, an xz-component of the moving magnetic field, or the like. For example, magnetic sensor 230 may include sensing elements implemented as bridges (e.g., half bridges, full bridges, Wheatstone bridges, etc.), where each bridge may be used as a sensing element corresponding to a component of the magnetic field.

In some implementations, the integrated circuit may include an integrated controller (e.g., such that an output of magnetic sensor 230 may include information that describes a position of magnet 220 and movable object 210). Additional details regarding magnetic sensor 230 are described below with regard to FIG. 3.

Controller 240 may include one or more circuits associated with determining a position of movable object 210 based on a moving magnetic field produced by magnet 220. For example, controller 240 may include one or more circuits (e.g., an integrated circuit, a control circuit, a feedback circuit, etc.). Controller 240 may receive input signals from one or more sensors, such as one or more magnetic sensors 230, may process the input signals (e.g., using an analog signal processor, a digital signal processor, etc.) to generate an output signal, and may provide the output signal to one or more other devices or systems. For example, controller 240 may receive one or more input signals from magnetic sensor 230, and may use the one or more input signals to generate an output signal that identifies the position of movable object 210.

The number and arrangement of apparatuses shown in FIG. 2 are provided as an example. In practice, there may be additional apparatuses, fewer apparatuses, different apparatuses, or differently arranged apparatuses than those shown in FIG. 2. Furthermore, two or more apparatuses shown in FIG. 2 may be implemented within a single apparatus, or a single apparatus shown in FIG. 2 may be implemented as multiple, distributed apparatuses. Additionally, or alternatively, a set of apparatuses (e.g., one or more apparatuses) of environment 200 may perform one or more functions described as being performed by another set of apparatuses of environment 200.

Figure 3:
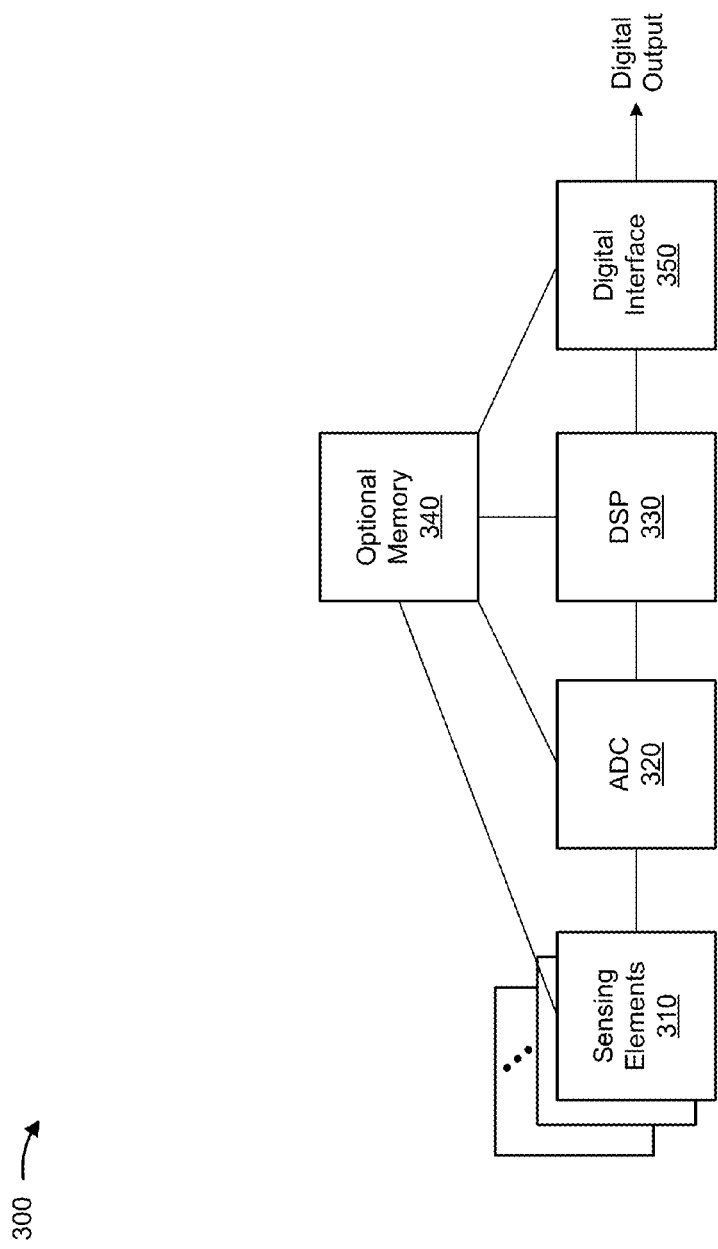
FIG. 3 is a diagram of example components of a magnetic sensor included in the example environment of FIG. 2.

FIG. 3 is a diagram of example components of magnetic sensor 230 included in example environment 200 of FIG. 2. As shown, magnetic sensor 230 may include sensing elements 310, an analog-to-digital convertor (ADC) 320, a digital signal processor (DSP) 330, an optional memory component 340, and an output interface 350.

Sensing elements 310 may include one or more apparatuses for sensing an amplitude of a component of a magnetic field present at the magnetic sensor 230 (e.g., the magnetic field produced by magnet 220). For example, sensing element 310 may include a Hall sensor that operates based on a Hall-effect. As another example, sensing element 310 may include a magnetoresistance (MR) sensor, comprised of a magnetoresistive material (e.g., nickel iron (NiFe)), where the electrical resistance of the magnetoresistive material may depend on a strength and/or a direction of the magnetic field present at the magnetoresistive material. Here, sensing element 310 may measure magnetoresistance based on an anisotropic magnetoresistance (AMR) effect, a giant magnetoresistance (GMR) effect, a tunnel magnetoresistance (TMR) effect, or another type of magnetoresistance based sensor (xMR). As an additional example, sensing element 310 may include a sensor that operates based on induction, such as a variable reluctance (VR) sensor or a coil.

ADC 320 may include an analog-to-digital converter that converts an analog signal from the one or more sensing elements 310 to a digital signal. For example, ADC 320 may convert analog signals, received from the one or more sensing elements 310, into digital signals to be processed by DSP 330. ADC 320 may provide the digital signals to DSP 330. In some implementations, magnetic sensor 230 may include one or more ADCs 320.

DSP 330 may include a digital signal processing device or a collection of digital signal processing devices. In some implementations, DSP 330 may receive a digital signal from ADC 320 and may process the digital signal to form an output signal (e.g., destined for controller 240 as shown in FIG. 2), such as an output signal associated with determining the position of movable object 210.

Optional memory component 340 may include a read only memory (ROM) (e.g., an EEPROM), a random access memory (RAM), and/or another type of dynamic or static storage device (e.g., a flash memory, a magnetic memory, an optical memory, etc.) that stores information and/or instructions for use by magnetic sensor 230. In some implementations, memory component 340 may store information associated with processing performed by DSP 330. In some implementations, memory component 340 may store configurable values or parameters for the sensing elements 310 and/or information for one or more other components of magnetic sensor 230, such as ADC 320 or output interface 350.

Output interface 350 may include an interface via which magnetic sensor 230 may receive and/or provide information from and/or to another device, such as controller 240 (e.g., see FIG. 2). For example, output interface 350 may provide the output signal, determined by DSP 330, to controller 240 and may receive, in some implementations, information from the controller 240. In some implementations, output interface may include digital interface or an analog interface.

The number and arrangement of components shown in FIG. 3 are provided as an example. In practice, magnetic sensor 230 may include additional components, fewer components, different components, or differently arranged components than those shown in FIG. 3. Additionally, or alternatively, a set of components (e.g., one or more components) of magnetic sensor 230 may perform one or more functions described as being performed by another set of components of magnetic sensor 230.

FIGS. 4A-4D are illustrative representations that show examples arrangements 400 of sensing elements 310 of magnetic sensor 230. In some implementations, as described above, magnetic sensor 230 may include sensing elements 310, where each sensing element is configured to sense a component of the moving magnetic field present at magnetic sensor 230.

In some implementations, sensing elements 310 of magnetic sensor 230 may be arranged to sense components of a magnetic field corresponding to an axis of a Cartesian coordinate system. For example, as shown in FIG. 4A, a first set of sensing elements 310 (e.g., a first pair of vertical hall plates, configured to sense a component of the magnetic field that is parallel in relation to a semiconductor surface, labeled with "Bx" in FIG. 4A) may be positioned to sense an x-component of the magnetic field that corresponds to an x-axis of the Cartesian coordinate system. As further shown in FIG. 4A, a second set of sensing elements 310 (e.g., a second pair of vertical hall plates, labeled with "By" in FIG. 4A) may be positioned to sense a y-component of the magnetic field that corresponds to a y-axis of the Cartesian coordinate system. In some implementations, as illustrated in FIG. 4A, magnetic sensor 230 may be a two-dimensional (2D) sensor (e.g., since sensing elements 310 of magnetic sensor 230 are configured to sense two components of the magnetic field produced by magnet 220).

Figure 4B:
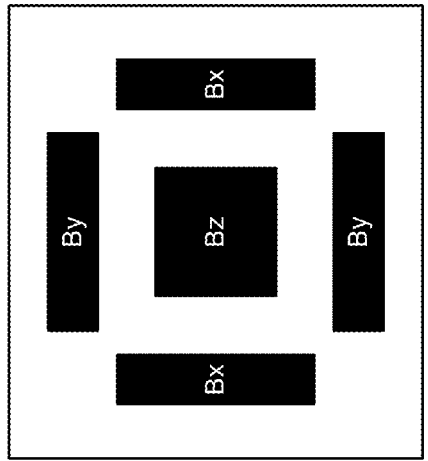
FIGS. 4A-4D are illustrative representations that show example arrangements of sensing elements of a magnetic sensor.
Figure 4A:
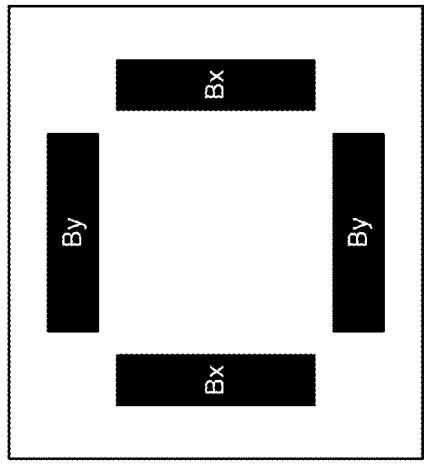

As another example, as shown in FIG. 4B, magnetic sensor 230 may include the first set of sensing elements 310 and the second set of sensing elements 310 described with regard to FIG. 4A, and may also include another sensing element 310 (e.g., a lateral hall plate, configured to sense a component of the magnetic field that is perpendicular in relation to a semiconductor surface, labeled with "Bz" in FIG. 4B) may be configured to sense a z-component of the magnetic field that corresponds to a z-axis of the Cartesian coordinate system. In some implementations, as illustrated in FIG. 4B, magnetic sensor 230 may be a three-dimensional (3D) sensor (e.g., since sensing elements 310 of magnetic sensor 230 are configured to sense three components of the magnetic field produced by magnet 220).

Figures 4C, 4D:
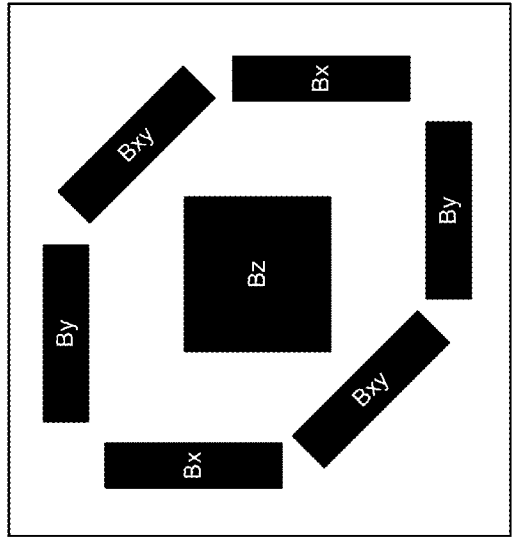

In some implementations, sensing elements 310 of magnetic sensor 230 may be arranged to sense components of the magnetic field corresponding to an axis that is not orthogonal to an axis of the Cartesian coordinate system (herein referred to as a non-Cartesian axis). For example, as shown in FIG. 4C, a first set of sensing elements 310 (e.g., a first pair of vertical hall plates, labeled with "Bx" in FIG. 4C) may be positioned to sense the x-component of the magnetic field that corresponds to the x-axis of the Cartesian coordinate system. As further shown in FIG. 4C, a second set of sensing elements 310 (e.g., a second pair of vertical hall plates, labeled with "By" in FIG. 4C) may be positioned to sense the y-component of the magnetic field that corresponds to the y-axis of the Cartesian coordinate system. As further shown in FIG. 4C, a third set of sensing elements 310 (e.g., a third pair of vertical hall plates, labeled with "Bxy" in FIG. 4C) may be positioned to sense an xy-component of the magnetic field that corresponds to an xy-axis that lies on a plane associated with the x-axis and the y-axis, where the xy-axis may lie at an angle between the orthogonal x and y axes, such as a 45 degree angle, a 30 degree angle, a 60 degree angle, or the like (as shown in FIGS. 4C and 4D, described below).

While the non-Cartesian axis of FIG. 4C corresponds to the plane including the x-axis and the y-axis, in another example, the non-Cartesian axis may include another axis, such as a yz-axis that lies on a plane corresponding to the y-axis and the z-axis (e.g., where the yz-axis may lie at an angle between the orthogonal y and z axes), an axis that does not lie on a plane corresponding to any pair of Cartesian axes (e.g., a linearly independent axis), or the like.

As shown in FIG. 4D, in some implementations, magnetic sensor 230 may include the first set of sensing elements 310, the second set of sensing elements 310, and the third set of sensing elements described with regard to FIG. 4C, and may also include another sensing element 310 (e.g., a lateral hall plate, labeled with "Bz" in FIG. 4D) that is configured to sense the z-component of the magnetic field that corresponds to the z-axis of the Cartesian coordinate system. As such, in some implementations (as illustrated in FIG. 4D), magnetic sensor 230 may be configured to sense more than three components of the magnetic field (e.g., the x-component, the y-component, the z-component, and the xy-component).

In some implementations, magnetic sensor 230 may include sensing elements 310 configured to sense components of the magnetic field corresponding to one or more non-Cartesian axes in order to improve a plausibility checking capability of magnetic sensor 230 and/or to increase diversity of magnetic sensor 230, as described below.

Additionally, or alternatively, magnetic sensor 230 may include sensing elements 310 configured to sense components of the magnetic field corresponding to one or more non-Cartesian axes in order to provide redundancy of magnetic sensor 230 (e.g., in the event that a sensing element 310 of magnetic sensor 230 fails, experiences an error, etc.). In some implementations, redundancy may also be achieved by introducing non-linear ranges associated with one or more axes (e.g., in order to increase a distance between a pair of potential positions of magnet 220). Additionally, or alternatively, redundancy may be achieved by causing current, associated with the magnetic field and corresponding to a particular axis, to flow diagonally (e.g., from one corner to another) across sensing element 310 in order to tilt sensitivity of sensing element 310 with respect to the particular axis. This allows the magnetic field to differ with respect to the particular axis even in a case where a pair of potential positions would normally share a magnetic field range for the particular axis.

In some implementations, an axis corresponding to a component of the magnetic field may be linearly dependent in relation to a pair of other axes corresponding to a pair of other components of the magnetic field. An axis is said to be linearly dependent if the axis can be defined as a linear combination of a pair of other axes. Otherwise, the axis is defined as being linearly independent. For example, the xy-axis, as described above with regard to FIGS. 4C and 4D, may be said to be linearly dependent in relation to the x-axis and the y-axis where, for example, the xy-axis is defined as a combination of the x-axis and the y-axis such that the xy-axis lies at a forty-five degree angle in relation to both the x-axis and the y-axis on a plane including the x-axis and the y-axis.

Additionally, or alternatively, an axis corresponding to a component of the magnetic field may be linearly independent in relation to other axes corresponding to other components of the magnetic field. For example, a non-Cartesian axis may be said to be linearly independent in relation to the x-axis and the y-axis where, for example, the non-Cartesian axis cannot be defined as a combination of the x-axis and the y-axis.

As indicated above, FIGS. 4A-4D are provided merely as examples. In other words, all configurations, positions, orientations, relations, and the like, associated with example arrangements 400 are provided merely as examples to facilitate an understanding of how sensing elements 310 may be positioned in magnetic sensor 230. Other examples are possible and may differ from what was described with regard to FIGS. 4A-4D.

FIG. 5 is a flow chart of an example process 500 for identifying a position of movable object 210 based on a set of magnetic field components and information that defines potential positions of movable object 210. In some implementations, one or more process blocks of FIG. 5 may be performed by magnetic sensor 230. In some implementations, one or more process blocks of FIG. 5 may be performed by another device or a group of devices separate from or including magnetic sensor 230, such as controller 240.

As shown in FIG. 5, process 500 may include sensing a set of magnetic field components, of a magnetic field produced by a magnet, along a set of corresponding axes (block 510). For example, magnetic sensor 230 may sense a set of magnetic field components, of a magnet field produced by magnet 220, along a set of corresponding axes.

In some implementations, magnetic sensor 230 may sense the components of the magnetic field for which sensing elements 310 of magnetic sensor 230 are configured to sense. For example, assuming that magnetic sensor 230 includes sensing elements 310 arranged as described with regard to FIG. 4D, magnetic sensor 230 may sense the x-component of the magnetic field, the y-component of the magnetic field, the xy-component of the magnetic field, and the z-component of the magnetic field.

As further shown in FIG. 5, process 500 may include determining information that defines potential positions of a movable object associated with the magnet (block 520). For example, magnetic sensor 230 may determine information that defines potential positions of movable object 210 associated with magnet 220. In some implementations, magnetic sensor 230 may determine the information that identifies the potential positions when (e.g., before, after, concurrently with) magnetic sensor 230 senses the set of magnetic field components.

The potential positions of movable object 210 may include two or more positions of movable object 210 that correspond to two or more positions at which magnet 220 may be physically located (i.e., two or more positions to which movable object 210 may move). For example, in a gear shift application, the potential positions of movable object 210, and hence magnet 220, may correspond to two or more possible positions at which a gear shift lever (i.e., movable object 210) may be physically located.

In some implementations, the information that describes a potential position may include a set of magnetic field ranges, where each magnetic field range corresponds to a component of the magnetic field sensed by magnetic sensor 230. The set of magnetic field ranges, associated with the potential position, may uniquely define the potential position (i.e., such that no other potential position is defined by a same set of magnetic field ranges). The information that defines the set of potential positions may include multiple sets of magnetic field ranges, where each set corresponds to a different potential position of magnet 220.

As an example, information that defines a first potential position may include a first magnetic field range for the x-component of the magnetic field, a first magnetic field range for the y-component of the magnetic field, and a first magnetic field range for the xy-component of the magnetic field, while information that defines a second potential position may include a second magnetic field range for the x-component of the magnetic field, a second magnetic field range for the y-component of the magnetic field, and a second magnetic field range for the xy-component of the magnetic field. In some implementations, two or more potential positions may share a same magnetic field range for a component of the magnetic field, but may not share same magnetic field ranges for all components of the magnetic field.

In some implementations, the information that defines the potential position may be graphically represented by a two dimensional area with respect to a plane including a first axis and a second axis. For example, the information the defines the potential position may be graphically represented by a square area, a rectangular area, or the like, when plotted with respect to the x-axis and the y-axis (where sides of the two-dimensional area may correspond to the magnetic field ranges for the x-component and the y-component that define the potential position), as described below with regard to FIGS. 7A and 7B.

Additionally, or alternatively, the information that defines the potential position may be graphically represented by a three dimensional space within a space defined by a first axis, a second axis, and a third axis. For example, the information that defines the potential position may be graphically represented by a cubic space, a three-dimensional rectangular space, or the like, when plotted with respect to the x-axis, the y-axis, and the z-axis (where sides of the three-dimensional space may correspond to the magnetic field ranges for the x-component, the y-component, and the z-component that define the potential position).

In some implementations, magnetic sensor 230 may determine the information that defines the potential positions based on information stored or accessible by magnetic sensor 230. For example, magnetic sensor 230 may store or have access to the information that defines the set of potential positions as a result of a sensor setup process associated with magnetic sensor 230.

The sensor setup process may include a process for identifying the information that defines the potential positions for a given sensor application. A first step of the sensor setup process may include, for example, defining movement of magnet 220 and/or a position of magnetic sensor 230 for the given sensor application (e.g., physically arranging movable object 210, magnet 220, and magnetic sensor 230). A second step of the sensor setup process may include evaluating (e.g., via actual measurement, via simulation) initial magnetic field values for each component of the magnetic field for all potential positions of movable object 210. A third step of the sensor setup process may include defining magnetic field ranges corresponding to each of the initial magnetic field values (e.g., to account for sensitivity, offset drifts, noise, quantization, etc.). In this way, the two-dimensional areas and/or three-dimensional spaces, that define each potential position, may be identified.

In some implementations, the sensor setup process may include determining whether a pair of two-dimensional areas and/or three-dimensional spaces overlap and/or are within a threshold distance of each other. Here, if any pair of two-dimensional areas and/or three-dimensional spaces overlap and/or are within the threshold distance of each other, then the sensor setup process may include adjusting and/or modifying the movement of magnet 220 and/or the position of magnetic sensor 230, and repeating the sensor setup process. When the sensor setup process is appropriately complete such that each of the potential positions is defined by a unique set of magnetic field ranges, magnetic sensor 230 may store the information that defines the potential positions. In some implementations, as described in further detail below, magnetic sensor 230 may compare the sensed components of the magnetic field to the information that defines the potential positions in order to identify a position of magnet 220, and hence movable object 210.

As further shown in FIG. 5, process 500 may include identifying a position of the movable object based on the set of magnetic field components and the information that defines the potential positions (block 530). For example, magnetic sensor 230 may identify a position of movable object 210 based on the set of magnetic field components and the information that defines the potential positions. In some implementations, magnetic sensor 230 may identify the position of movable object 210 after magnetic sensor 230 senses the components of the magnetic field. Additionally, or alternatively, magnetic sensor 230 may identify the position of movable object 210 after magnetic sensor 230 determines the information that defines the potential positions.

In some implementations, magnetic sensor 230 may identify the position of movable object 210 based on comparing the sensed components of the magnetic field and the information that defines the potential positions. For example, assume that a first potential position is defined by a first magnetic field range, corresponding to a component of a magnetic field along a first axis, and a second magnetic field range corresponding to a component of the magnetic field along a second axis. In this example, magnetic sensor 230 may sense a component of the magnetic field along the first axis and a component of the magnetic field along the second axis. Magnetic sensor 230 may then compare the sensed component of the magnetic field along the first axis to the first magnetic field range, and compare the sensed component of the magnetic field along the second axis to the second magnetic field range.

Here, if the sensed component of the magnetic field along the first axis is within the first magnetic field range, and if the sensed component of the magnetic field along the second axis is within the second magnetic field range, then magnetic sensor 230 may identify the position of movable object 210 as the position defined by the first magnetic field range and the second magnetic field range.

Alternatively, if the sensed component of the magnetic field along the first axis is not within the first magnetic field range, and/or if the sensed component of the magnetic field along the second axis is not within the second magnetic field range, then magnetic sensor 230 may determine that magnet 220 is not at the position defined by the first magnetic field range and the second magnetic field range. In such a case, magnetic sensor 230 may then compare the sensed components of the magnetic field to magnetic field ranges that define other potential positions until magnetic sensor 230 identifies the position of movable object 210. In some implementations, if magnetic sensor 230 is unable to identify the position of movable object 210 (e.g., when the sensed components of the magnetic field are not within a set of corresponding magnetic field ranges for any potential position), magnetic sensor 230 may indicate an error, provide an indication that magnetic sensor 230 is unable to identify the position, and/or provide other information, such as information that identifies a closest potential position, information that identifies the sensed components of the magnetic field, or the like.

In some implementations, magnetic sensor 230 may identify the position of movable object 210 based on a single sensed component of the magnetic field, an example of which is described below with regard to FIG. 7A. Additionally, or alternatively, magnetic sensor 230 may use one or more components of the magnetic field as a plausibility check with respect to one or more other components of the magnetic field, an example of which is described below with regard to FIG. 7B.

As further shown in FIG. 5, process 500 may include providing an output based on identifying the position of the movable object (block 540). For example, magnetic sensor 230 may provide an output based on identifying the position of movable object 210. In some implementations, magnetic sensor 230 may provide the output when magnetic sensor 230 identifies the position of movable object 210. Additionally, or alternatively, magnetic sensor 230 may provide the output when magnetic sensor 230 receives an indication that magnetic sensor 230 is to provide the output.

In some implementations, magnetic sensor 230 may provide information associated with identifying the position of magnet 220, such as information that identifies the position of movable object 210, information indicating that magnet 220 is in a potential position, information that identifies the sensed components of the magnetic field, or the like.

In this way, magnetic sensor 230 may identify a position of movable object 210, connected to magnet 220, based on a set of sensed components of a magnetic field corresponding to a set of axes (i.e., without converting the set of sensed components to polar coordinates). Further, magnetic sensor 230 may reduce consumption of processing resources and/or decrease an amount of time associated with identifying the position of movable object 210 since, for example, identifying the position of movable object 210 based on the set of sensed components does not require evaluation any trigonometric functions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
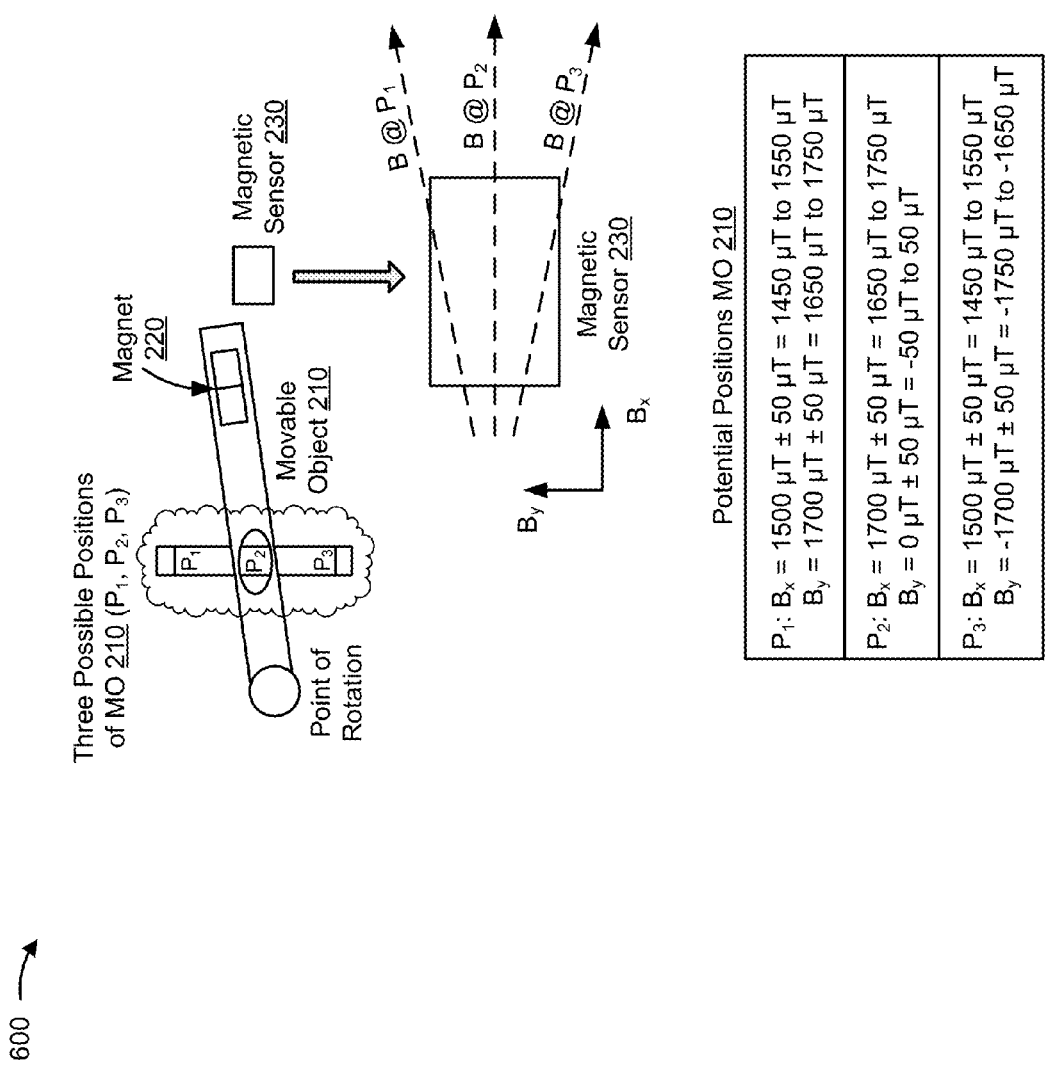
FIGS. 6A and 6B are diagrams of an example implementation relating to the example process shown in FIG. 5.
Figure 6B:
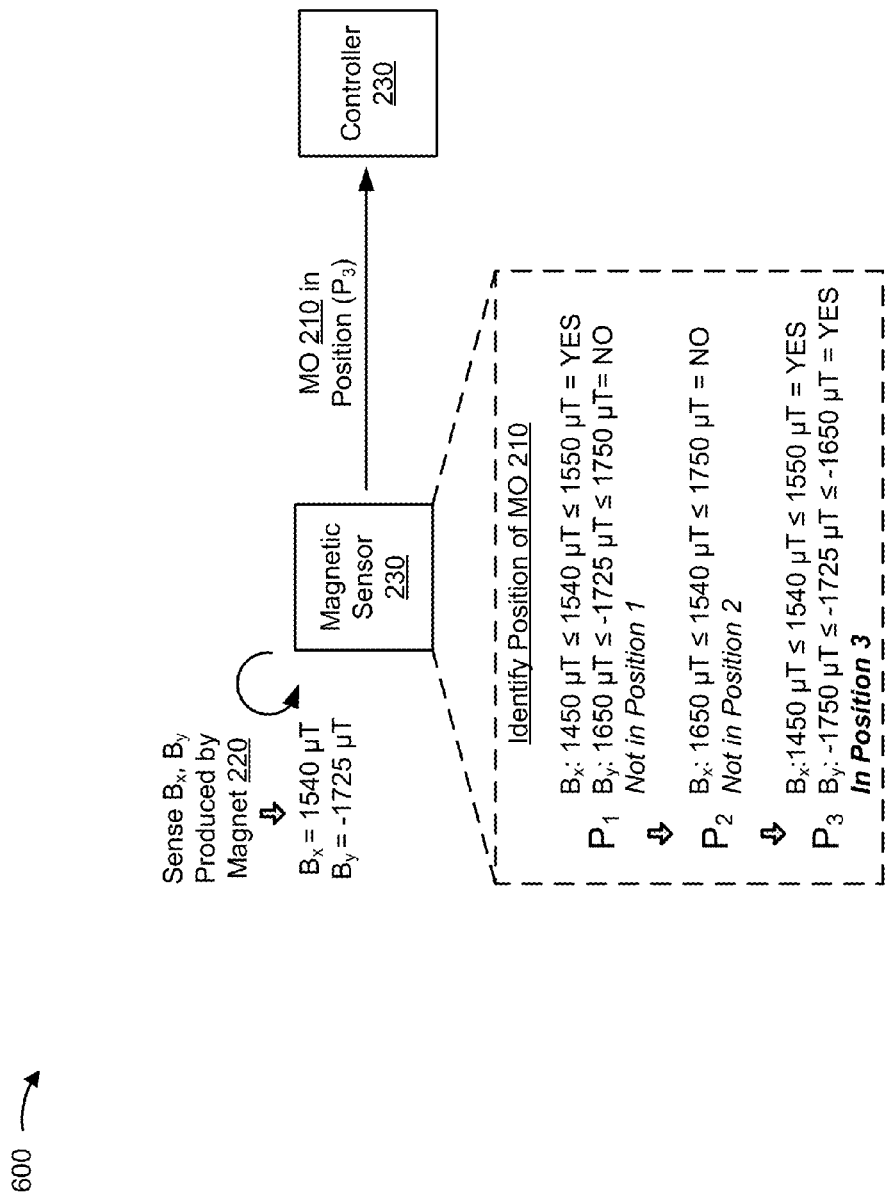

FIGS. 6A and 6B are diagrams of an example implementation 600 relating to the example process shown in FIG. 5. As shown in the upper portion of FIG. 6A, magnet 220 is connected to movable object 210, and movable object 210 may rotate about a point of rotation such that movable object 210 is in one of three potential positions (e.g., $P_1$, $P_2$, or $P_3$). As shown by the middle portion of FIG. 6A, the magnetic field, present at magnetic sensor 230, may differ at $P_1$, $P_2$, or $P_3$ in correspondence to the position of magnet 220. As further shown, magnetic sensor 230 is positioned near movable object 210 and is configured to sense the x-component and the y-component of the magnetic field generated by magnet 220.

As shown in the table in the lower portion of FIG. 6A, assume that magnetic sensor 230 stores information that defines $P_1$, $P_2$, and $P_3$. The information the defines $P_1$ may indicate that $P_1$ is defined by a magnetic field range of 1450 microTeslas (µT) to 1550 µT for the x-component of the magnetic field (e.g., identified as $B_x$), and a magnetic field range of 1650 µT to 1750 µT for the y-component of the magnetic field (e.g., identified as $B_y$). As further shown, the information that defines $P_2$ may indicate that $P_2$ is defined by a magnetic field range of 1650 µT to 1750 µT for the x-component of the magnetic field, and a magnetic field range of −50 µT to 50 µT for the y-component of the magnetic field. As also shown, the information that defines $P_3$ may indicate that $P_3$ is defined by a magnetic field range of 1450 µT to 1550 µT for the x-component of the magnetic field, and a magnetic field range of −1750 µT to −1650 µT for the y-component of the magnetic field.

As shown in FIG. 6B, at a given time, magnetic sensor 230 may sense the x-component of the magnetic field present at magnetic sensor 230 (e.g., $B_x$=1540 µT), and the y-component of the magnetic field present at magnetic sensor 230 (e.g., $B_y$=−1725 µT). As further shown, magnetic sensor 230 may determine (e.g., based on information stored by magnetic sensor 230) the information that defines $P_1$, $P_2$, and $P_3$.

As further shown, magnetic sensor 230 may identify the position of movable object 210 based on the sensed components of the magnetic field and the information that defines $P_1$, $P_2$, or $P_3$. For example, as shown with respect to $P_1$, magnetic sensor 230 may compare the sensed x-component of the magnetic field to the $P_1$ magnetic field range for the x-component, and may determine that the sensed x-component is within the $P_1$ magnetic field range for the x-component (e.g., $B_x$: 1450 µT≤1540 µT≤1550 µT=YES). As further shown, magnetic sensor 230 may compare the sensed y-component of the magnetic field to the $P_1$ magnetic field range for the y-component, and may determine that the sensed y-component is not within the $P_1$ magnetic field range for the y-component (e.g., $B_y$: 1650 µT≤−1725 µT≤1750 µT=NO). As such, magnetic sensor 230 may determine that movable object 210 is not in $P_1$.

Similarly, as shown with respect to $P_2$, magnetic sensor 230 may compare the sensed x-component of the magnetic field to the $P_2$ magnetic field range for the x-component, and may determine that the sensed x-component is not within the $P_2$ magnetic field range for the x-component (e.g., $B_x$: 1650 µT≤1540 µT≤1750 µT=NO). As such, magnetic sensor 230 may determine that movable object 210 is not in $P_2$.

As shown, with respect to $P_3$, magnetic sensor 230 may compare the sensed x-component of the magnetic field to the $P_3$ magnetic field range for the x-component, and may determine that the sensed x-component is within the $P_3$ magnetic field range for the x-component (e.g., $B_x$: 1450 µT≤1540 µT≤1550 µT=YES). As further shown, magnetic sensor 230 may compare the sensed y-component of the magnetic field to the $P_3$ magnetic field range for the y-component, and may determine that the sensed y-component is within the $P_3$ magnetic field range for the y-component (e.g., $B_y$: −1750 µT≤−1725 µT≤−1650 µT=YES). As such, magnetic sensor 230 may determine that movable object 210 is located in position $P_3$.

As further shown, based on identifying the position of movable object 210, magnetic sensor 230 may provide, to controller 240, an output indicating that movable object 210 is in position $P_3$. In this way, magnetic sensor 230 may identify the position of movable object 210 without converting the set of sensed components to polar coordinates.

As indicated above, FIGS. 6A and 6B are provided merely as examples. Other examples are possible and may differ from what was described with regard to FIGS. 6A and 6B.

Figure 7A:
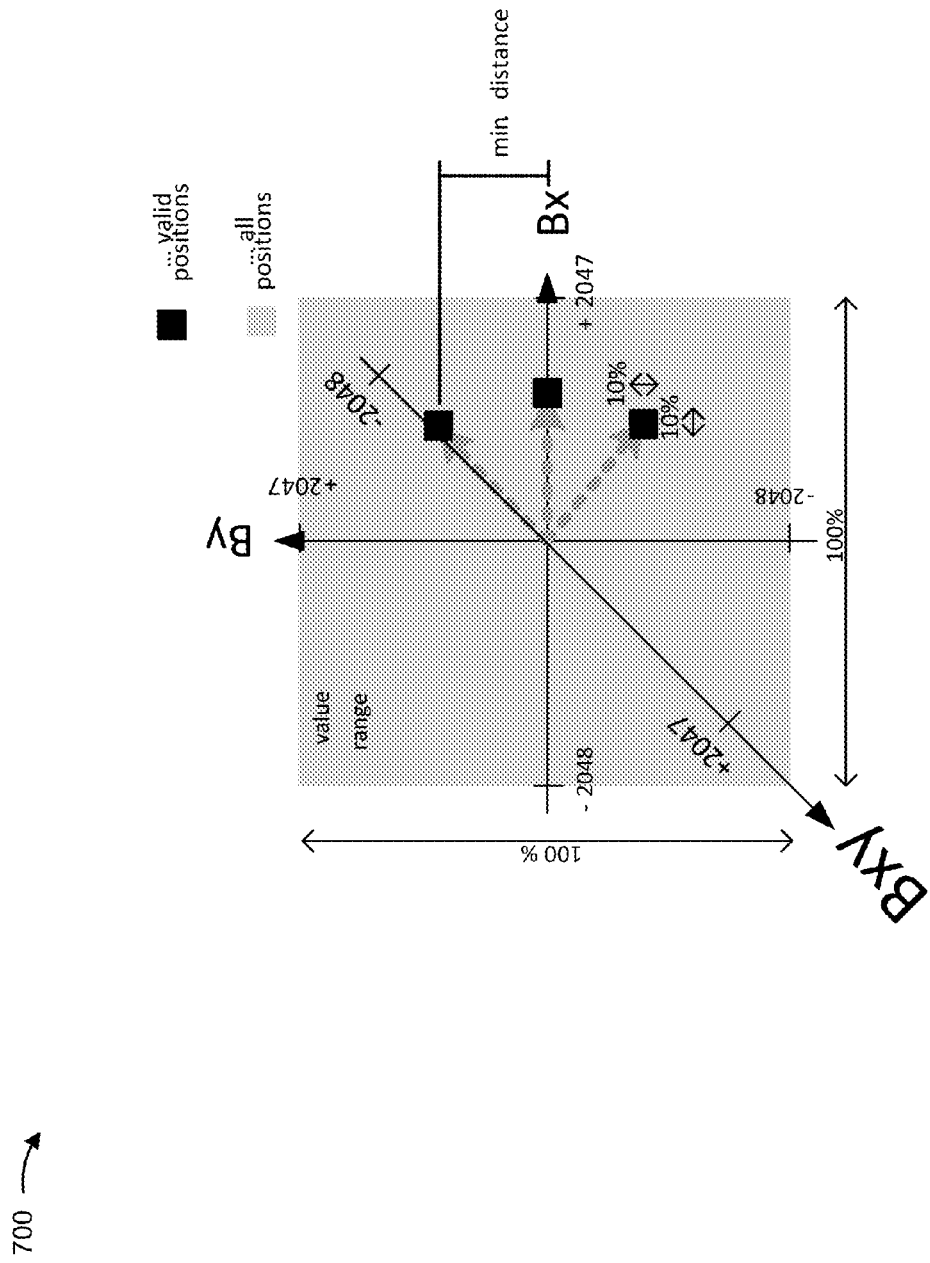
FIGS. 7A and 7B include example graphical representations of information that defines potential positions of a magnet.
Figure 7B:
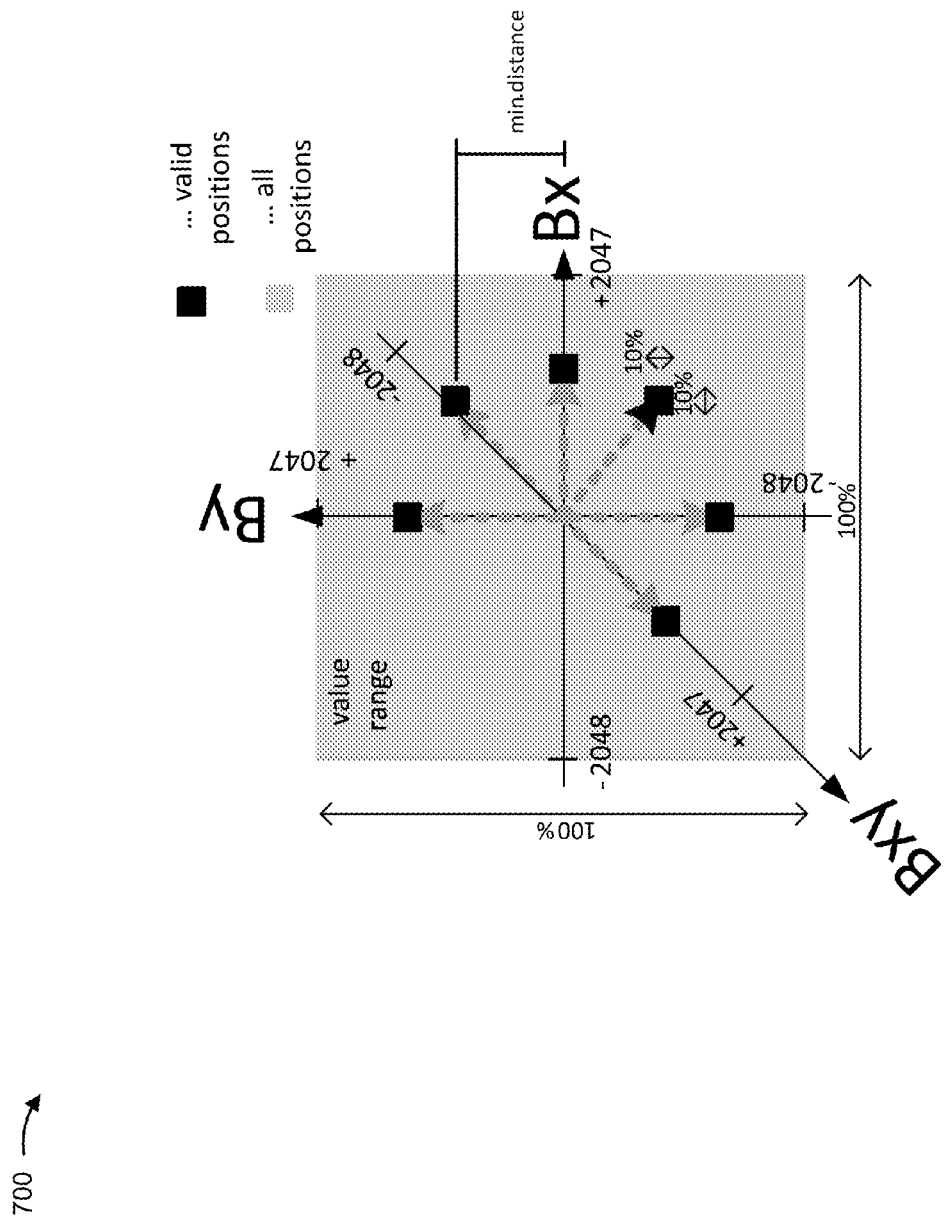

FIGS. 7A and 7B include example graphical representations 700 of information that defines potential positions of a magnet. For the purposes of FIG. 7A, assume that magnetic sensor 230 includes sensing elements 310 positioned to sense the x-component of the magnetic field, the y-component of the magnetic field, and the xy-component of the magnetic field at forty-five degrees between the x-component and the y-component, as described above with regard to FIG. 4C.

As shown in FIG. 7A, and as illustrated by the lightly shaded "all positions" outer square area, magnetic sensor 230 may be capable of sensing the components of the magnetic for an overall range associated with each direction. For example, as shown, magnetic sensor 230 may be capable of sensing the x-component, the y-component, and the xy-component for a range of approximately −2050 µT to 2050 µT.

As further shown in FIG. 7A, and as illustrated by the three darkly shaded "valid positions" square areas, information that defines three potential positions for movable object 210 (e.g., an upper position, a middle position, and a lower position) may be represented with respect to a Bx axis, corresponding to the x-component, and a By axis corresponding to the y-component. Here, each potential position may be described by a two-dimensional area (e.g., a square, a rectangle, etc.) where each side of the two-dimensional area corresponds to a magnetic field range for a particular component of the magnetic field for the potential position. As shown, the magnetic field present at magnetic sensor 230 is represented by the dashed arrows pointing toward each two-dimensional area. Here, magnetic sensor 230 may determine that movable object 210 is in a potential position when the sensed components of the magnetic field fall within the two-dimensional area representing the potential position.

In some implementations, a magnetic field range for a component that defines a position may be represented by a percentage of the overall magnetic field range associated with the component. For example, based on the sensor setup process, magnetic sensor 230 may store information indicating that a magnetic field range for the x-component of the magnetic field, associated with a potential position, is described as the x-component of the magnetic field measured during the sensor setup process ±5% (i.e., 10% total) of the overall magnetic field range that may be sensed by magnetic sensor 230.

In some implementations, magnetic sensor 230 may identify the position of movable object 210 based on two sensed components of the magnetic field and the information that defines the potential position. For example, magnetic sensor 230 may identify the position of movable object 210 by determining which two-dimensional area (defined by a pair of magnetic field ranges) the sensed x-component of the magnetic field and the sensed y-component of the magnetic field fall within, as described above with regard to example implementation 600.

Additionally, or alternatively, magnetic sensor 230 may identify the position of magnet 220 based on a single sensed component of the magnetic field and the information that defines the potential position. For example, since the x-components of the two-dimensional areas of FIG. 7A overlap and/or nearly overlap, magnetic sensor 230 may identify the position of magnet 220 based on only magnetic field ranges associated with the y-component of the magnetic field (e.g., since the sensed y-component of the magnetic field is unique for each potential position). In this example, the sensed x-component may be used as a plausibility check, but this may not be reliable when, as in this example, the variation in the magnetic field ranges for the x-direction is insignificant (as compared to the variation in the magnetic field ranges for the y-component). However, in this case, magnetic sensor 230 may perform a plausibility check based on the sensed xy-component of the magnetic field. Here, the plausibility check is possible using the sensed xy-component of the magnetic field since each potential position is uniquely identified along the xy-axis (i.e., there is no overlap between any position with respect to the xy-axis).

As shown in FIG. 7B, extending a detection range to a wider set of potential positions shows that use of the sensed y-component of the magnetic field alone may not be sufficient to identify the position of movable object 210. In this example, the x-component and the y-component may be needed to identify the position of movable object 210. Further, a diverse identification of the position necessitates a combination of two sensed components, and this may be achieved using the x-component and the xy-component, or the y-component and the xy-component.

Notably, while implementations associated with FIGS. 7A and 7B are described in the context of the potential positions being defined by two-dimensional areas, in other implementations, the potential positions may be defined by a three-dimensional space (e.g., a cube, a rectangle, etc.), and magnetic sensor 230 may apply similar techniques to determine the position of movable object 210 within a three-dimensional space, such as when magnetic sensor 230 includes sensing elements 310 as described above with regard to FIGS. 4C and 4D.

As indicated above, FIGS. 7A and 7B are provided merely as examples. Other examples are possible and may differ from what was described with regard to FIGS. 7A and 7B.

Figure 8:
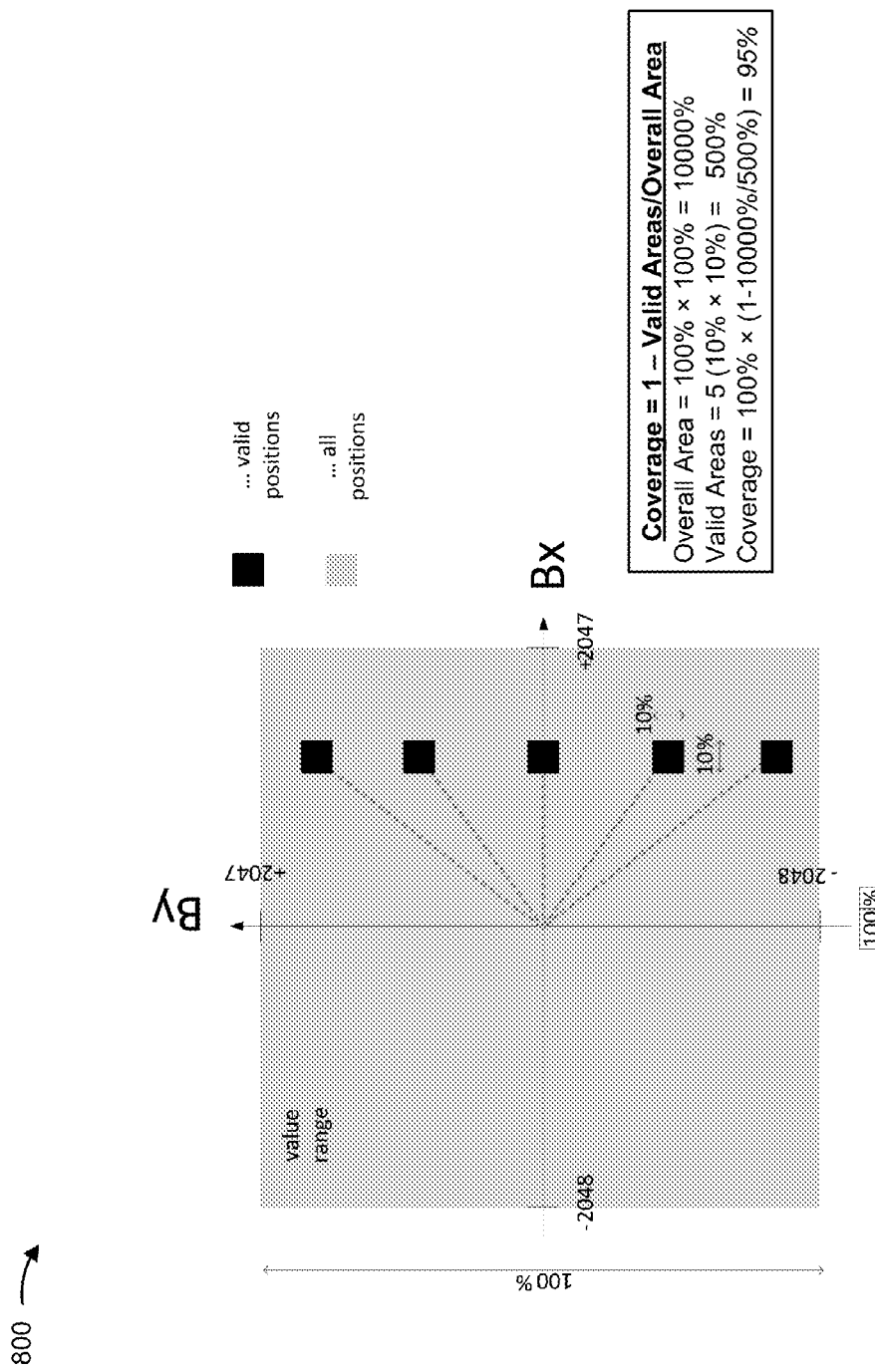
FIG. 8 includes an example graphical representation of a manner in which coverage and error detection capability of a magnetic sensor may be determined.

FIG. 8 includes an example graphical representation 800 of a manner in which coverage and error detection capability of magnetic sensor 230 may be determined. For the purposes of FIG. 8, assume that magnetic sensor 230 includes sensing elements 310 positioned to sense the x-component of the magnetic field and the y-component of the magnetic field, as described above with regard to FIG. 4A. Further, assume that potential positions of magnet 220 are defined by two-dimensional areas (identified as darkly shaded small squares) within an overall area (identified as a lightly shaded large square), in a manner similar to that described above with regard to example graphical representations 700.

As shown, coverage of magnetic sensor 230 may be determined based on the overall area and the two dimensional areas. As shown, the coverage of magnetic sensor 230 may be 95% (e.g., Coverage=1−Valid Areas/Overall Area; Overall Area=100%×100%=10000%; Valid Areas=5 (10%× 10%)=500%; Coverage=100%×(1−10000%/500%)=95%). In other words, in this example, there exists a 95% probability that magnetic sensor 230 will detect an error associated with identifying the position of magnet 220. Moreover, any error is easily detected, and is detected without additional measurement, since the error may be identified based on the sensed components of the magnetic field and the information that defines the potential positions. For example, magnetic sensor 230 may detect an error when the sensed components do not match with any set of magnetic field ranges corresponding to the potential positions.

As indicated above, FIG. 8 is provided merely as an example. Other examples are possible and may differ from what was described with regard to FIG. 8.

Implementations described herein may relate to a magnetic sensor configured to determine a position of a movable object, connected to a magnet, based on a set of sensed components of a magnetic field corresponding to a set of axes (i.e., without converting the set of sensed components to polar coordinates). In some implementations, the sensed components of the magnetic field may correspond to axes of a Cartesian coordinate system (e.g., an x-axis, a y-axis, a z-axis, etc.) and/or one or more other axes (e.g., an axis that is not orthogonal to the x-axis, the y-axis, and/or the z-axis). Determining the position of the movable object in this manner improves coverage of the magnetic sensor, error detection of the magnetic sensor, and/or plausibility checking capability of the magnetic sensor.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A magnetic sensor, comprising:
one or more sensing elements configured to:
sense a first magnetic field component corresponding to a first axis of a magnetic field produced by a magnet;
sense a second magnetic field component corresponding to a second axis of the magnetic field;
determine information that defines potential positions of a movable object associated with the magnet,
each potential position, of the potential positions, being defined by a first magnetic field range for the first magnetic field component and a second magnetic field range for the second magnetic field component;
identify a position of the movable object based on the first magnetic field component, the second magnetic field component, and the information that defines the potential positions; and
provide an output based on identifying the position of the movable object.

2. The magnetic sensor of claim 1, where the one or more sensing elements, when identifying the position of the movable object, are configured to:
determine that the first magnetic field component is within the first magnetic field range corresponding to a particular potential position of the potential positions;
determine that the second magnetic field component is within the second magnetic field range corresponding to the particular potential position; and
identify the position as the particular potential position based on determining that the first magnetic field component is within the first magnetic field range and that the second magnetic field component is within the second magnetic field range.

3. The magnetic sensor of claim 2, where the one or more sensing elements, when providing the output, are to:
provide an indication that the movable object is in a valid position based on identifying the position as the particular potential position.

4. The magnetic sensor of claim 1, where the one or more sensing elements are further configured to:
sense a third magnetic field component corresponding to a third axis of the magnetic field; and
where the one or more sensing elements, when identifying the position of the movable object, are configured to:
identify the position of the movable object based on the first magnetic field component, the second magnetic field component, the third magnetic field component, and the information that defines the potential positions,
where each potential position, of the potential positions, is further defined by a third magnetic field range for the third magnetic field component.

5. The magnetic sensor of claim 4, where the first axis is orthogonal to the second axis and the third axis, and the second axis is orthogonal to the third axis.

6. The magnetic sensor of claim 4, where the first axis is orthogonal to the second axis, and the third axis is X degrees from the first axis or the second axis on a plane formed by the first axis and the second axis, where 0<X<90.

7. The magnetic sensor of claim 4, where the third axis is not linearly independent of the first axis and the second axis.

8. The magnetic sensor of claim 7, where the third magnetic field component provides redundancy associated with identifying the position of the movable object.

9. The magnetic sensor of claim 4, where the one or more sensing elements include a type of sensing element configured to sense a component of the magnetic field that is parallel in relation to a surface of the one or more sensing elements.

10. The magnetic sensor of claim 9, where the type of sensing element includes a Hall based sensor, a magnetoresistance based sensor (xMR) or an inductive based sensor (VR or coil).

11. A system, comprising:
a magnetic sensor configured to:
sense a first magnetic field component corresponding to a first axis of a magnetic field produced by a magnet;
sense a second magnetic field component corresponding to a second axis of the magnetic field;
determine information that defines potential positions of a movable object to which the magnet is connected,
each potential position, of the potential positions, being defined by a first magnetic field range for the first magnetic field component and a second magnetic field range for the second magnetic field component;
identify a position of the movable object based on the first magnetic field component or the second magnetic field component, and the information that defines the potential positions; and
provide an output that includes information that identifies the position of the movable object.

12. The system of claim 11, where the magnetic sensor, when identifying the position of the movable object, is configured to:
determine that the first magnetic field component is within the first magnetic field range corresponding to a particular potential position of the potential positions;
determine that the second magnetic field component is within the second magnetic field range corresponding to the particular potential position; and
identify the position as the particular potential position based on determining that the first magnetic field component is within the first magnetic field range and that the second magnetic field component is within the second magnetic field range.

13. The system of claim 11, where the magnetic sensor is configured to sense the first magnetic field component and the second magnetic field component based on at least one of a Hall effect, a tunnel magnetoresistance (TMR) effect, a giant magnetoresistance (GMR) effect, an anisotropic magnetoresistance (AMR) effect, or a variable reluctance (VR) effect.

14. The system of claim 11, where the first axis is orthogonal to the second axis.

15. The system of claim 11, where the magnetic sensor includes one or more sensing elements included on a single integrated circuit.

16. The system of claim 11, where the magnet includes a permanent magnet, an electromagnet, a combination of a permanent magnet and an electromagnet, the magnet producing a static magnetic field or a dynamic magnetic field.

17. A magnetic sensor, comprising:

one or more sensing elements configured to:

sense a first magnetic field component corresponding to a first axis of a magnetic field produced by a magnet;

sense a second magnetic field component corresponding to a second axis of the magnetic field;

sense a third magnetic field component corresponding to a third axis of the magnetic field;

determine information that defines potential positions of a movable object associated with the magnet, each potential position, of the potential positions, being defined by a first magnetic field range for the first magnetic field component, a second magnetic field range for the second magnetic field component, and a third magnetic field range for the third magnetic field component;

identify a position of the movable object based on the first magnetic field component, the second magnetic field component, or the third magnetic field component, and the information that defines the potential positions; and provide an output based on identifying the position of the movable object.

18. The magnetic sensor of claim 17, where the first axis is orthogonal to the second axis and the third axis, and the second axis is orthogonal to the third axis.

19. The magnetic sensor of claim 17, where the first axis is orthogonal to the second axis, and the third axis is not orthogonal to the first axis or the second axis.

20. The magnetic sensor of claim 17, where the one or more sensing elements include a type of sensing element configured to sense a component of a magnetic field that is perpendicular in relation to a surface of the one or more sensing elements.

* * * * *